United States Patent [19]

Sasazawa

[11] Patent Number: 4,713,726

[45] Date of Patent: Dec. 15, 1987

[54] DIELECTRIC CERAMIC COMPOSITION

[75] Inventor: Kazuo Sasazawa, Tokyo, Japan

[73] Assignee: Taiyo Yuden Kabushiki Kaisha, Tokyo, Japan

[21] Appl. No.: 889,647

[22] Filed: Jul. 24, 1986

[30] Foreign Application Priority Data

Jul. 29, 1985 [JP] Japan .................. 60-167172

[51] Int. Cl.$^4$ .............................. C04B 35/46
[52] U.S. Cl. ..................... 361/321; 501/137; 501/138; 501/139
[58] Field of Search ............... 501/134, 135, 136, 137, 501/138, 139; 361/321

[56] References Cited

U.S. PATENT DOCUMENTS

| | | | |
|---|---|---|---|
| 4,054,531 | 10/1977 | Takahashi et al. | 501/136 X |
| 4,338,403 | 7/1982 | Kawashima et al. | 501/136 O |
| 4,394,456 | 7/1983 | Sakabe et al. | 501/139 X |
| 4,500,942 | 2/1985 | Wilson | 501/139 X |

FOREIGN PATENT DOCUMENTS

| | | | |
|---|---|---|---|
| 0074298 | 7/1978 | Japan | 501/139 |
| 55-25690 | 7/1980 | Japan . | |
| 0165204 | 12/1981 | Japan | 501/137 |
| 0061667 | 4/1982 | Japan | 501/139 |
| 0080603 | 5/1982 | Japan | 501/139 |
| 0080604 | 5/1982 | Japan | 501/139 |

Primary Examiner—Mark L. Bell
Assistant Examiner—Karl Group
Attorney, Agent, or Firm—Flynn, Thiel, Boutell & Tanis

[57] ABSTRACT

A dielectric ceramic composition which comprises a mixture of 7 to 25 mole% of $BaTiO_3$, 0.1 to 15 mole% of $Bi_2O_3$, 50 to 65 mole% of $TiO_2$, 0.1 to 5 mole% of $LaO_{3/2}$ and 15 to 45 mole% of $NdO_{3/2}$ in a total of 100 mole%. At least one member selected from the group consisting of $Y_2O_3$, $Gd_2O_3$ and $CeO_2$, and at least one member selected from the group consisting of $Cr_2O_3$, $MnO_2$, NiO and CoO are further added to the mixture in amounts of from 0.1 to 5 parts by weight and from 0.01 to 1 part by weight per 100 parts by weight of the mixture, respectively.

4 Claims, No Drawings

DIELECTRIC CERAMIC COMPOSITION

BACKGROUND OF THE INVENTION

1. Field of the Invention

This invention relates to ceramic capacitors and more particularly, to dielectric ceramic compositions suitable for fabrication of temperature compensating ceramic capacitors.

2. Description of the Prior Art

As is well known in the art, dielectric ceramic compositions are used as temperature compensating ceramic capacitors. The ceramic compositions for these purposes should preferable have a wide temperature characteristic of specific inductive capacity of from 0 to −280 and a high specific inductive capaciy of, for example, 115 while keeping the constant characteristic values. Typical of such ceramic compositions is a composition, as described in Japanese Patent Publication No. 55-25690. This composition comprises 5 to 25 mole % of $BaTio_3$, 3 to 15 mole % of $Bi_2O_3$, 55 to 70 mole % of $TiO_2$, and 10 to 20 mole % of $La_2O_3$ in a total amount of 100 mole %, to which at least one oxide selected from $Y_2O_3$, $Gd_2O_3$ and $Nd_2O_3$ is added in an amount of 4 to 20 wt % of the above composition.

The quality factor, Q, of this dielectric ceramic composition is below 6300 in a maximum and approximately 5600 on average when a dielectric layer of the ceramic capacitor is about 0.85 mm.

The electrostatic capacitance of a capacitor is proportional to the square of a diameter of a counter electrode and is inversely proportional to the thickness. If it is intended to miniaturize a capacitor, the thickness of the dielectric ceramic has to be reduced by the square of a decrement in diameter of the counter electrode. However, when the thickness of the dielectric ceramic is reduced, the Q value also decreases substantially in proportion to the reduction of the thickness.

For the miniaturization of ceramic capacitors, there is a demand of dielectric ceramic composition which can yield higher Q values than known compositions.

SUMMARY OF THE INVENTION

It is accordingly an object of the invention to provide a dielectric ceramic composition which meets the above demand and ensures higher Q values than known ceramic compositions.

It is another object of the invention to provide a dielectric ceramic composition which is particularly suitable for fabricating temperature compensating ceramic capacitors and which has a high quality factor, Q, ranging from 8100 to 10100.

It is a further object of the invention to provide a dielectric ceramic composition from which a ceramic capacitor is obtained which is miniaturized by about 30% for the same quality factor.

The above objects can be achieved, according to the invention, by a dielectric ceramic composition which comprises 100 parts by weight of a mixture of 7 to 25 mole % of $BaTiO_3$, 0.1 to 15 mole % of $Bi_2O_3$, 50 to 65 mole % of $TiO_2$, 0.1 to 5 mole % of $LaO_{3/2}$ and 15 to 45 mole % of $NdO_{3/2}$ in a total amount of 100 mole %, from 0.1 to 5 parts by weight of at least one member selected from the group consisting of $Y_2O_3$, $Gd_2O_3$ and $CeO_2$, and from 0.01 to 1.0 part by weight of at least one member selected from the group consisting of $Cr_2O_3$, $MnO_2$, NiO and CoO.

DETAILED DESCRIPTION OF THE INVENTION

The dielectric ceramic composition of the invention should have a high quality factor, Q, in the range not lower than 8000. The choice and amounts of the respective oxide components in the ceramic composition depend chiefly on electric characteristics and the quality factor of the composition when the composition is shaped into dielectric ceramic discs for use as a disc-type ceramic capacitor.

The main components of the ceramic composition include $BaTiO_3$, $Bi_2O_3$, $TiO_2$, $LaO_{3/2}$ and $NdO_{3/2}$. The reason why the amounts of the respective components are determined as defined above are as follows.

$BaTiO_3$ should be contained in amounts of from 7 to 25 mole %. Outside the range, the quality factor is undesirable reduced to below 8000. $Bi_2O_3$ should be contained in the range of from 0.1 to 15 mole %. Outside the range, mole %, the resulting composition has a quality factor below 8000. With $TiO_2$, the amount should be from 50 to 65 mole %. Outside the range, the quality factor also becomes lower than 8000. $LaO_{3/2}$ should be contained in amounts of from 0.1 to 5 mole %. Otherwise, the quality factor lower than 8000 would result. With $NdO_{3/2}$, the amount is in the range of from 15 to 45 mole %. Amounts less than 15 mole % are unfavorable because the quality factor becomes lower than 8000. Over 45 mole %, the resulting composition cannot be sintered at temperatures not higher than 1400° C.

At least one component selected from $Y_2O_3$, $Gd_2O_3$ and $CeO_2$ should be contained in an amount of from 0.1 to 5 parts by weight per 100 parts by weight of the total of the main components. Outside the range, the quality factor becomes lower than 8000.

Moreover, at least one component selected from $Cr_2O_3$, $MnO_2$, NiO and CoO should be contained in an amount of from 0.01 to 1 part by weight, in total, per 100 parts by weight of the main components. Amounts less than 0.01 part by weight are not favorable because of little or no effect of the addition. Amounts larger than 1.0 part by weight result in a quality factor lower than 8000.

The ceramic composition comprising the components described above may be shaped into any desired form by any techniques known in the art, for example, by mixing the components in a suitable mixer or ball mill, molding the mixture in a suitable mold under pressure, and finally sintering in an oxidative atmosphere. The sintering should preferably be effected at temperatures not higher than 1400° C.

The present invention is more particularly described by way of example, which sould not be construed as limiting the present invention.

EXAMPLE 18.75 g (7 mole %) of $BaTiO_3$, 0.47 g (0.1 mole %) of $Bi_2O_3$, 39.95 g (50 mole %) of $TiO_2$, 8,15 g (5 mole %, calculated as $LaO_{3/2}$), and 63.76 g (37.9 mole %, calculated as $NdO_{3/2}$) were weighed. In addition, 0.13 g (0.1 part by weight per 100 parts by weight of the above main components in total) and 0.01 g (0.01 part by weight per 100 parts by weight of the above main components) of the respective components listed in the following Table were, respectively, weighed. These components were placed in ball mill along with pure water and mixed under wet conditions for 24 hours.

The resultant mixture was dehydrated and dried at 150° C. for 5 hours. Subsequently, the dried mixture was reduced into pieces in a ball mill. To the pieces was added 5 g of polyvinyl alcohol in an automated mortar, followed by passing a 60 mesh sieve and granulating the powder.

0.76 g of the granules was placed in a mold and press molded under a pressure of about 50 kg/cm² to obtain a disc having a diameter of 18 mm and a thickness of 1 mm. The above procedure was repeated to make 20 discs in total.

These discs were sintered in an oxidative atmosphere at a temperature of about 1300 C.° for about 2 hours, thereby obtaining dielectric ceramic discs each having a diameter of 15.5 mm and a thickness of 0.7 mm. Thereafter, the ceramic disc was applied on one surface thereof with a silver paste, followed by baking at about 750° C. for 30 minutes. The other surface of the disc was also treated in the same manner, thereby obtaining a disctype ceramic capacitor having a diameter, D, of 14 mm and a counter electrode. These twenty discs were provided as sample 1.

The twenty discs of sample 1 were subjected to measurements of a specific inductive capacity, C, at a frequency of 1 MHz and at a temperature of 20° C., a temperature coefficient, TC, of the specific inductive capacity and a quality factor, Q, at a frequency of 1 MHz and at a temperature of 20° C. The average values of the respective characteristics are shown in sample No.1 of Table.

The specific inductive capacity was determined according to the following equation $$\epsilon = 144 \times C_{20} \times t/D^2$$

in which $C_{20}$ represents an electrostatic capacitance at 20° C. at a frequency of 1 MHz, t represents a thickness of the dielectric ceramic disc, and D represents a diameter of the counter electrode.

The temperature coefficient, TC, was determined according to the following equation $$TC = [(C_{85} - C_{20})/C_{20} \times 65] \times 10^6 ppm/°C.$$

in which $C_{85}$ represents an electrostatic capacitance at 85° C. at a frequency of 1 MHz and $C_{20}$ has the same meaning as defined above.

The above procedure was repeated except that ceramic compositions indicated in the table were used, thereby obtaining dielectric ceramic discs of samples 2 to 20. These discs were applied with electrodes in the same manner as described above. These samples were also subjected to measurements of the specific inductive capacity, $\epsilon$, the temperature coefficient, TC, and the quality factor, Q, in the same manner as described above. The results are also shown in the table.

TABLE

| Sample No. | Composition mole % | parts by weight | parts by weight | $\epsilon$ | Tc ppm/°C. | Q |
|---|---|---|---|---|---|---|
| 1 | BaTiO₃: 7.0<br>Bi₂O₃: 0.1<br>TiO₂: 50.0<br>LaO₃/₂: 5.0<br>NdO₃/₂: 37.9 | Y₂O₃: 0.1<br>Gd₂O₃: 0<br>CeO₂: 0 | Cr₂O₃: 0.01<br>MnO₂: 0<br>NiO: 0<br>CoO: 0 | 92 | −31 | 9400 |
| 2 | BaTiO₃: 7.0<br>Bi₂O₃: 0.1<br>TiO₂: 50.0<br>LaO₃/₂: 5.0<br>NdO₃/₂: 37.9 | Y₂O₃: 0<br>Gd₂O₃: 0.5<br>CeO₂: 0 | Cr₂O₃: 0<br>MnO₂: 0.1<br>NiO: 0<br>CoO: 0 | 89 | −20 | 9700 |
| 3 | BaTiO₃: 7.0<br>Bi₂O₃: 0.1<br>TiO₂: 50.0<br>LaO₃/₂: 5.0<br>NdO₃/₂: 37.9 | Y₂O₃: 0<br>Gd₂O₃: 0<br>CeO₂: 5.0 | Cr₂O₃: 0<br>MnO₂: 0<br>NiO: 1.0<br>CoO: 0 | 86 | −8 | 9100 |
| 4 | BaTiO₃: 7.0<br>Bi₂O₃: 0.1<br>TiO₂: 50.0<br>LaO₃/₂: 5.0<br>NdO₃/₂: 37.9 | Y₂O₃: 0.1<br>Gd₂O₃: 0.1<br>CeO₂: 0 | Cr₂O₃: 0<br>MnO₂: 0<br>NiO: 0<br>CoO: 0.01 | 87 | −9 | 9200 |
| 5 | BaTiO₃: 7.0<br>Bi₂O₃: 0.1<br>TiO₂: 50.0<br>LaO₃/₂: 5.0<br>NdO₃/₂: 37.9 | Y₂O₃: 0<br>Gd₂O₃: 0.5<br>CeO₂: 0.5 | Cr₂O₃: 0.01<br>MnO₂: 0.01<br>NiO: 0<br>CoO: 0 | 86 | −14 | 9700 |
| 6 | BaTiO₃: 7.0<br>Bi₂O₃: 0.1<br>TiO₂: 50.0<br>LaO₃/₂: 5.0<br>NdO₃/₂: 37.9 | Y₂O₃: 2.5<br>Gd₂O₃: 0<br>CeO₂: 2.5 | Cr₂O₃: 0<br>MnO₂: 0.1<br>NiO: 0.1<br>CoO: 0 | 82 | −6 | 10000 |
| 7 | BaTiO₃: 7.0<br>Bi₂O₃: 0.1<br>TiO₂: 50.0<br>LaO₃/₂: 0.1<br>NdO₃/₂: 42.8 | Y₂O₃: 0.1<br>Gd₂O₃: 0.1<br>CeO₂: 0.1 | Cr₂O₃: 0<br>MnO₂: 0<br>NiO: 0.5<br>CoO: 0.5 | 84 | −16 | 9100 |
| 8 | BaTiO₃: 7.0<br>Bi₂O₃: 0.1<br>TiO₂: 50.0<br>LaO₃/₂: 0.1<br>NdO₃/₂: 42.8 | Y₂O₃: 0.5<br>Gd₂O₃: 0.5<br>CeO₂: 0.5 | Cr₂O₃: 0.1<br>MnO₂: 0.1<br>NiO: 0<br>CoO: 0.1 | 86 | −15 | 9200 |
| 9 | BaTiO₃: 7.0<br>Bi₂O₃: 0.1<br>TiO₂: 50.0<br>LaO₃/₂: 0.1 | Y₂O₃: 1.5<br>Gd₂O₃: 1.5<br>CeO₂: 1.5 | Cr₂O₃: 0.1<br>MnO₂: 0.1<br>NiO: 0.1<br>CoO: 0 | 82 | −6 | 8900 |

TABLE-continued

| Sample No. | Composition mole % | parts by weight | parts by weight | ε | Tc ppm/°C. | Q |
|---|---|---|---|---|---|---|
| 10 | $NdO_{3/2}$: 42.8<br>$BaTiO_3$: 7.0<br>$Bi_2O_3$: 0.5<br>$TiO_2$: 50.0<br>$LaO_{3/2}$: 0.1 | $Y_2O_3$: 1.0<br>$Gd_2O_3$: 0<br>$CeO_2$: 0 | $Cr_2O_3$: 0<br>$MnO_2$: 0.1<br>$NiO$: 0<br>$CoO$: 0 | 89 | −21 | 9100 |
| 11 | $NdO_{3/2}$: 42.4<br>$BaTiO_3$: 7.0<br>$Bi_2O_3$: 1.0<br>$TiO_2$: 50.0<br>$LaO_{3/2}$: 0.1 | $Y_2O_3$: 1.0<br>$Gd_2O_3$: 0<br>$CeO_2$: 0 | $Cr_2O_3$: 0<br>$MnO_2$: 0.1<br>$NiO$: 0<br>$CoO$: 0 | 92 | −12 | 10100 |
| 12 | $NdO_{3/2}$: 41.9<br>$BaTiO_3$: 7.0<br>$Bi_2O_3$: 5.0<br>$TiO_2$: 50.0<br>$LaO_{3/2}$: 0.1 | $Y_2O_3$: 1.0<br>$Gd_2O_3$: 0<br>$CeO_2$: 0 | $Cr_2O_3$: 0<br>$MnO_2$: 0.1<br>$NiO$: 0<br>$CoO$: 0 | 96 | −5 | 9100 |
| 13 | $NdO_{3/2}$: 37.9<br>$BaTiO_3$: 7.0<br>$Bi_2O_3$: 15.0<br>$TiO_2$: 50.0<br>$LaO_{3/2}$: 0.1 | $Y_2O_3$: 1.0<br>$Gd_2O_3$: 0<br>$CeO_2$: 0 | $Cr_2O_3$: 0<br>$MnO_2$: 0.1<br>$NiO$: 0<br>$CoO$: 0 | 116 | −107 | 8100 |
| 14 | $NdO_{3/2}$: 37.9<br>$BaTiO_3$: 7.0<br>$Bi_2O_3$: 1.0<br>$TiO_2$: 55.0<br>$LaO_{3/2}$: 0.1 | $Y_2O_3$: 0<br>$Gd_2O_3$: 1.0<br>$CeO_2$: 0 | $Cr_2O_3$: 0<br>$MnO_2$: 0<br>$NiO$: 0.1<br>$CoO$: 0 | 97 | −34 | 9400 |
| 15 | $NdO_{3/2}$: 36.9<br>$BaTiO_3$: 7.0<br>$Bi_2O_3$: 1.0<br>$TiO_2$: 60.0<br>$LaO_{3/2}$: 0.1 | $Y_2O_3$: 0<br>$Gd_2O_3$: 1.0<br>$CeO_2$: 0 | $Cr_2O_3$: 0<br>$MnO_2$: 0<br>$NiO$: 0.1<br>$CoO$: 0 | 106 | −73 | 9000 |
| 16 | $NdO_{3/2}$: 31.9<br>$BaTiO_3$: 7.0<br>$Bi_2O_3$: 1.0<br>$TiO_2$: 65.0<br>$LaO_{3/2}$: 0.1 | $Y_2O_3$: 0<br>$Gd_2O_3$: 1.0<br>$CeO_2$: 0 | $Cr_2O_3$: 0<br>$MnO_2$: 0<br>$NiO$: 0.1<br>$CoO$: 0 | 116 | −112 | 8100 |
| 17 | $NdO_{3/2}$: 26.9<br>$BaTiO_3$: 15.0<br>$Bi_2O_3$: 1.0<br>$TiO_2$: 55.0<br>$LaO_{3/2}$: 1.0 | $Y_2O_3$: 0<br>$Gd_2O_3$: 0<br>$CeO_2$: 1.0 | $Cr_2O_3$: 0<br>$MnO_2$: 0<br>$NiO$: 0<br>$CoO$: 0.1 | 95 | −29 | 9200 |
| 18 | $NdO_{3/2}$: 28.0<br>$BaTiO_3$: 25.0<br>$Bi_2O_3$: 1.0<br>$TiO_2$: 55.0<br>$LaO_{3/2}$: 1.0 | $Y_2O_3$: 0<br>$Gd_2O_3$: 0<br>$CeO_2$: 1.0 | $Cr_2O_3$: 0<br>$MnO_2$: 0<br>$NiO$: 0<br>$CoO$: 0.1 | 85 | −34 | 9300 |
| 19 | $NdO_{3/2}$: 18.0<br>$BaTiO_3$: 14.7<br>$Bi_2O_3$: 0.1<br>$TiO_2$: 55.0<br>$LaO_{3/2}$: 0.1 | $Y_2O_3$: 5.0<br>$Gd_2O_3$: 0<br>$CeO_2$: 0 | $Cr_2O_3$: 0.1<br>$MnO_2$: 0<br>$NiO$ 0<br>$CoO$: 0 | 81 | −41 | 9100 |
| 20 | $NdO_{3/2}$: 15.0<br>$BaTiO_3$: 14.7<br>$Bi_2O_3$: 0.1<br>$TiO_2$: 55.0<br>$LaO_{3/2}$: 0.1<br>$NdO_{3/2}$: 45.0 | $Y_2O_3$: 5.0<br>$Gd_2O_3$: 0<br>$CeO_2$: 0 | $Cr_2O_3$: 0.1<br>$MnO_2$: 0<br>$NiO$: 0<br>$CoO$: 0 | 83 | −8 | 8500 |

As will be apparent from the table, samples 1 through 20 have a specific inductive capacity, ε, ranging from 81 to 116, a temperature coefficient, TC, of the specific inductive capacity of form −112 to −6, and a quality factor, Q, of from 8100 to 10100.

As will be clear from the foregoing, the dielectric ceramic composition of the invention ensures a high quality factor, Q, of from 8100 to 10100, which is 1.8 times higher than the quality factor of known compositions. Accordingly, for the same level of the quality factor, a ceramic capacitor obtained from the ceramic composition of the invention can be made smaller in size by about 30% than ceramic capacitors obtained from the known compositions.

What is claimed is:

1. A dielectric ceramic composition which consists essentially of (A) 100 parts by weight of a mixture of 7 to 25 mole % of $BaTiO_3$, 0.1 to 15 mole % of $Bi_2O_3$, 50 to 65 mole % of $TiO_2$, 0.1 to 5 mole % of $LaO_{3/2}$ and 15 to 45 mole % of $NdO_{3/2}$ in a total amount of 100 mole % as main components, (B) from 0.1 to 5 parts by weight, per 100 parts by weight of the said components (A), of at least one member selected from the group consisting of $Y_2O_3$, $Gd_2O_3$ and $CeO_2$, and (C) from 0.01 to 1.0 part by weight, per 100 parts by weight of said main components (A), of at least one member selected from the group consisting of $Cr_2O_3$, $MnO_2$, $NiO$ and $CoO$.

2. In a ceramic capacitor having a dielectric layer made of a ceramic composition, the improvement comprising: said ceramic composition consists essentially of (A) 100 parts by weight of a mixture of 7 to 25 mole % of $BaTiO_3$, 0.1 to 15 mole % of $Bi_2O_3$, 50 to 65 mole % of $TiO_2$, 0.1 to 5 mole % of $LaO_{3/2}$ and 15 to 45 mole % of $NdO_{3/2}$ in a total amount of 100 mole % as main components, (B) from 0.1 to 5 parts by weight, per 100 parts by weight of said main components (A), of at least one member selected from the group consisting of $Y_2O_3$, $Gd_2O_3$ and $CeO_2$, and (C) from 0.01 to 1.0 part by weight, per 100 parts by weight of said main components (A), of at least one member selected from the group consisting of $Cr_2O_3$, $MnO_2$, NiO and CoO.

3. The dielectric ceramic composition of claim 1 wherein at least one member selected from the group consisting of $Cr_2O_3$, $MnO_2$, NiO and CoO is present in said ceramic composition in an amount of about 0.1 parts by weigth per 100 parts by weight of said main components.

4. The dielectric ceramic composition of claim 1 wherein at least one member selected from the group consisting of $Cr_2O_3$, $MnO_2$, NiO and CoO is present in said ceramic composition in an amount of about 1.0 parts by weight per 100 parts by weight of the main components.

* * * * *